(12) United States Patent
Becker (10) Patent No.: US 7,966,818 B2
(45) Date of Patent: Jun. 28, 2011

(54) GAS TURBINE COMBUSTION CHAMBER WITH FUEL INJECTION OVER AN ENTIRE COMBUSTION CHAMBER ANNULUS

(75) Inventor: Jochen Becker, Rengsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 954 days.

(21) Appl. No.: 11/701,539

(22) Filed: Feb. 2, 2007

(65) Prior Publication Data
US 2008/0101926 A1    May 1, 2008

(30) Foreign Application Priority Data
Feb. 2, 2006 (DE) .......................... 10 2006 004 840

(51) Int. Cl.
*F02C 7/22* (2006.01)
(52) U.S. Cl. .......................... 60/740; 60/804
(58) Field of Classification Search ............ 60/740, 60/804, 748, 749, 752; 239/461, 498, 499, 239/502
See application file for complete search history.

(56) References Cited

U.S. PATENT DOCUMENTS

| | | | |
|---|---|---|---|
| 2,625,794 A * | 1/1953 | Williams et al. | ............... 60/726 |
| 3,373,562 A | 3/1968 | Wormser | |
| 3,722,216 A | 3/1973 | Bahr | |
| 4,070,826 A | 1/1978 | Stenger | |
| 5,511,375 A | 4/1996 | Joshi | |
| 5,647,200 A | 7/1997 | Althaus | |
| 6,295,801 B1 | 10/2001 | Burrus | |

FOREIGN PATENT DOCUMENTS

| | | |
|---|---|---|
| DE | 21 48 826 A | 7/1972 |
| DE | 22 22 362 A | 11/1973 |
| DE | 26 41 685 A1 | 7/1977 |
| DE | 27 40 859 A1 | 3/1979 |
| DE | 44 06 399 A1 | 10/1994 |
| DE | 195 33 055 A1 | 3/1996 |
| DE | 195 39 771 A1 | 4/1997 |
| EP | 10 10 945 A2 | 6/2000 |

* cited by examiner

*Primary Examiner* — Michael Cuff
*Assistant Examiner* — Vikansha S Dwivedi
(74) *Attorney, Agent, or Firm* — Timothy J. Klima; Shuttleworth & Ingersoll, PLC (57) ABSTRACT

A gas turbine combustion chamber includes an annular combustion chamber (3) confined by an outer (1) and an inner combustion chamber wall (2) and is provided with several fuel injection nozzles (4). Air deflectors (6) are arranged in a front-side area of the annular combustion chamber (3) over the entire combustion chamber annulus (5) concentrically around a combustion chamber axis (12) and fuel injection nozzles (4) are distributed essentially uniformly over the combustion chamber annulus (5).

20 Claims, 7 Drawing Sheets

GAS TURBINE COMBUSTION CHAMBER WITH FUEL INJECTION OVER AN ENTIRE COMBUSTION CHAMBER ANNULUS

This application claims priority to German Patent Application DE102006004840.7 filed Feb. 2, 2006, the entirety of which is incorporated by reference herein.

BACKGROUND OF THE INVENTION

This invention relates to a gas turbine combustion chamber.

More specifically this invention relates to a gas turbine combustion chamber having an annular combustion chamber confined by an outer and an inner combustion chamber wall and provided with several fuel injection nozzles.

As is known from the state of the art, fuel is injected, or sprayed, into the annular combustion chamber space of annular combustion chambers via several. circumferentially distributed fuel Injection nozzles. In this process, a conical fuel curtain is mixed with an airflow swirling concentrically around the fuel injection nozzles. The vortex of fuel and air thus produced is concentric around the central axis of the fuel injection nozzle.

The known design of the combustion chamber annulus is disadvantageous in that large regions between the fuel injection nozzles lack an immediate supply of air and fuel. Thus, the area of the combustion chamber annulus is not fully employed for the formation of a mixture of fuel and air which is homogenous right from the beginning. The merely "locally" concentric injection of fuel around the fuel injection nozzles quite inadequately utilizes the space of the annular combustion chamber.

The locally injected, relatively large masses of fuel require a certain time, and thus a certain space, to provide a relatively coarse, ignitable and fairly uniformly distributed mixture. Consequently, the length of the annular combustion chamber must be dimensioned appropriately relative to the flow direction.

Furthermore, the problems described impair the combustion efficiency of the fuel-air mixture and involve considerable effort to further reduce nitrogen oxides. Moreover, the relatively erratic formation of the fuel-air mixture results in pressure, flow and temperature variations over the circumference of the annular combustion chamber.

In addition, due to the erratic injection of fuel, the temperature profile at the combustion chamber exit is relatively inhomogeneous in the circumferential direction, resulting in thermal problems in the area of the turbine and vibrations caused by different densities and flow velocities.

DESCRIPTION OF THE INVENTION

In a broad aspect, the present invention provides a gas turbine combustion chamber of the type specified above, which enables a more homogeneous fuel-air mixture as well as more uniform combustion conditions.

It is a particular object of the present invention to provide solution to the above problems by a combination of the features described herein. Further advantageous embodiments of the present invention will be apparent from the present description.

The present invention, provides for full utilization of the available cross-section of the combustion chamber annulus in that the fuel (fuel curtain) is functionally processed, or distributed, over the entire circumference of the annular combustion chamber. This is accomplished by way of the inventive air deflectors which serve, in connection with other design variants described hereinafter, as local vortex generators.

It is particularly favorable if the air deflectors are arranged in at least two concentric rows which orient the resultant airflows counter-directionally to each other in the circumferential direction. This results in strong swirls due to the individual airflows passing through the rows of air deflectors. The resultant air shears and partial airflows oriented tangentially to each other provide for particularly good swirl and distribution of the fuel injected.

The exit directions of the fuel injection nozzles may be angled or parallel to the local airflow direction. It is also possible to arrange, or orient, the exit directions of the fuel injection nozzles at an angle to or, in a modified variant, parallel to the central axis of the gas turbine.

In accordance with the present invention, the air deflectors are preferably arranged relative to each other such that many local turbulences are created, but with no (resultant) residual vortex existing in the total airflow passing through the combustion chamber annulus. Accordingly, the relatively small, local turbulences are created in the fuel injection area, while the remaining, subsequent area of the annular combustion chamber shows an essentially axial airflow suitable for uniform combustion of the fuel-air mixture. Thus, provision is also made for a more homogenous flow into the turbine or through the stator vanes arranged downstream of the combustion chamber, respectively.

In a particularly favorable embodiment of the present invention, the air deflectors may together form a grid structure. This will enable particularly effective local turbulences or vortexes to be produced, providing for appropriately fine distribution, or processing, of the sprayed-in fuel curtain. In order to improve the fuel injection behavior, the fuel injection nozzles may be integrated into the air deflectors.

The present invention is more fully described in the light of the accompanying drawings showing preferred embodiments. In the drawings.

Figure 1:
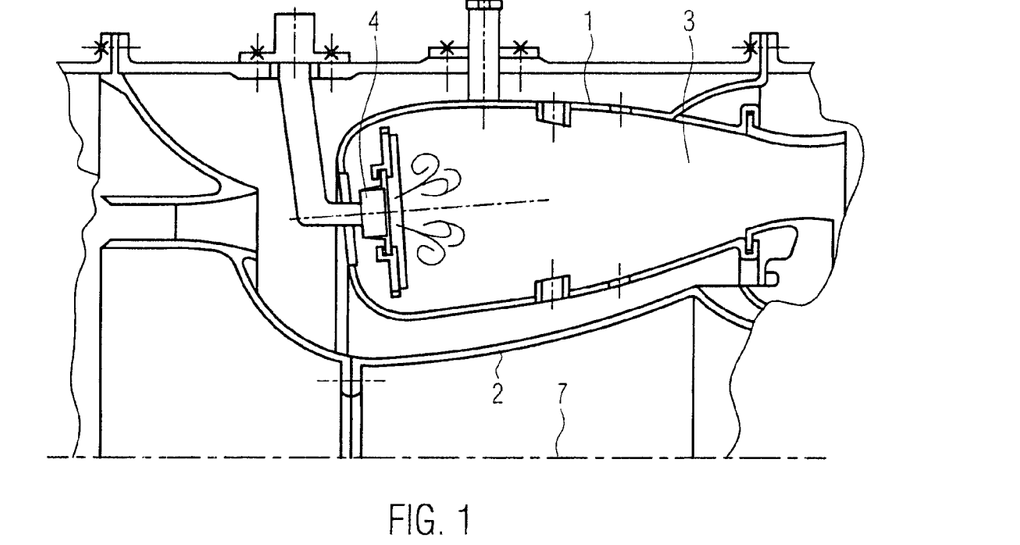
FIG. 1 is a schematic partial sectional view of an annular combustion chamber according to the state of the art.

FIG. 1 shows, in schematic representation, an annular combustion chamber 3 of a gas turbine. The annular combustion chamber 3 comprises an outer combustion chamber wall 1 and an inner combustion chamber wall 2 which are concentrically arranged to the axis 7 of the gas turbine. In this respect, the design of the annular combustion chamber corresponds to the state of the art so that further explanations, in particular with regard to the supply of air and fuel, can be dispensed with.

Figure 2:
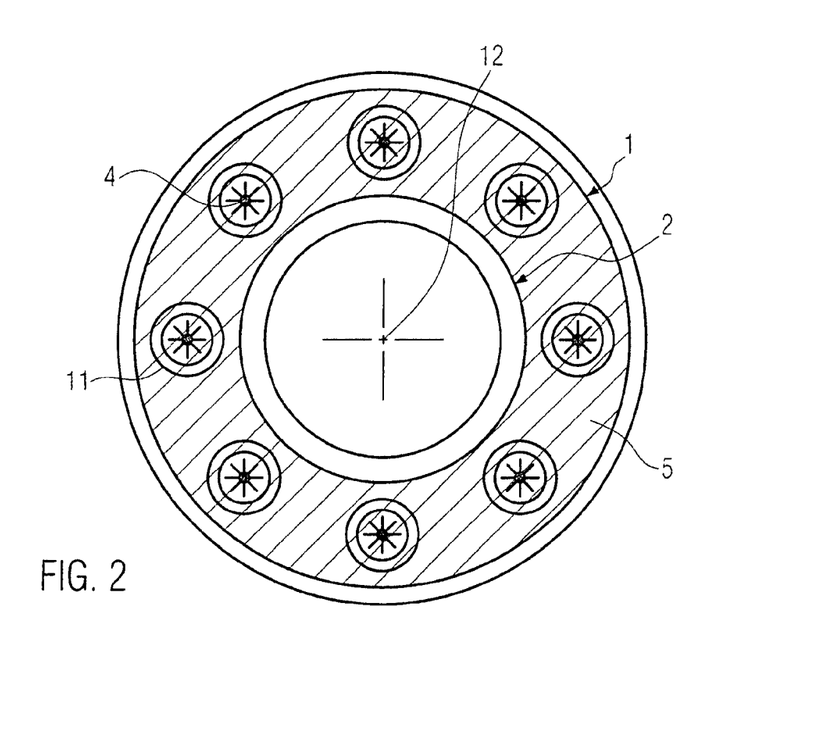
FIG. 2 is a schematic front view of the utilization concept of the combustion chamber space according to the state of the art.
Figure 3:
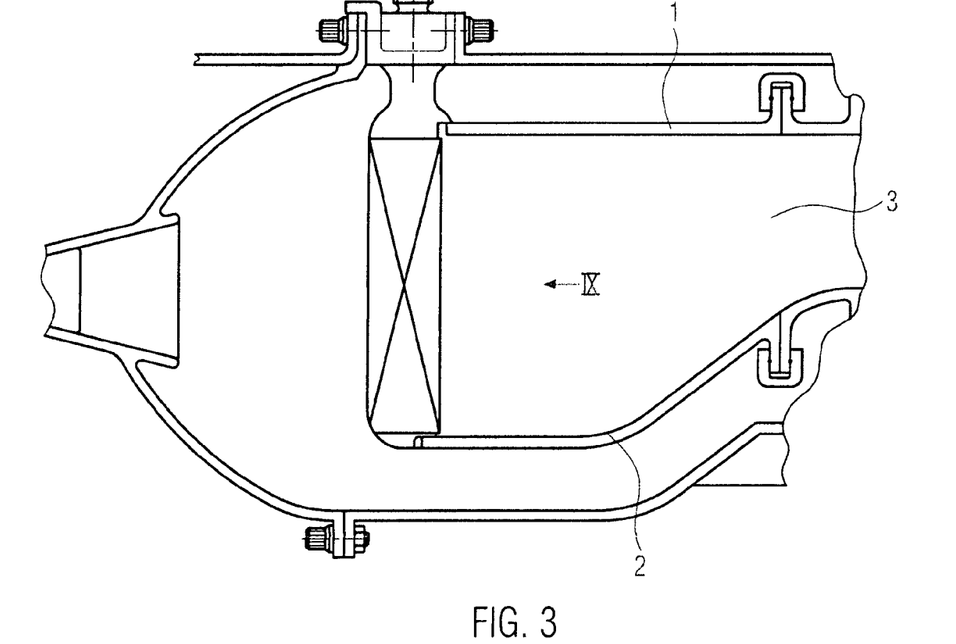
FIG. 3 is a simplified sectional side view of an example of a combustion chamber in accordance with the present invention, the combustion chamber being provided with a fuel injection grid.

FIG. 2 shows, in front view, an embodiment of the arrangement of the fuel injection nozzles 4 according to the state of the art. Obviously, the fuel injection nozzles 4 are circumferentially distributed, actually concentrically to the combustion chamber axis. One or several air inlet rings 11 are provided concentrically around each fuel injection nozzle 4. Thus, individual, singular arrangements of fuel injection nozzles 4 and accompanying air inlet rings 11 are provided. FIG. 3 shows, in schematic side view (section), a preferred embodiment of a combustion chamber according to the present invention. Arrowhead IX indicates the direction of view of FIG. 4.

The design shown here conforms to the so-called lean combustion concept in which almost the entire airflow is fed through the combustion chamber head (here grid) to the combustion chamber space and only a minor residual flow is bypassed for cooling purposes. A separation into primary and secondary air would, however, not detract from the inventive concept.

For cooling purposes, the combustion chamber walls 1 and 2 can be provided with numerous small and angled holes conformal with the flow pattern on the inner side of the combustion chamber walls (FIG. 3).

An embodiment according to the present invention is shown in FIGS. 4 to 8, in particular. Here, (primary) air is supplied via more than two tangentially counter-directional annular flow ducts which, in their entirety, form a type of profiled grid. The (primary) air is treated such by extension or restriction of the flow cross-sections that a stable combustion and position of the flame front can be ensured. In addition, multiple tangentially counter-directional and axially unidirectional flow fields are produced. The resultant conical vortexes produce small recirculation areas and also provide for improved flame stability. Here, fuel is sprayed into the combustion chamber space via small supply ducts in the grid which issue at small fuel injection nozzles 4 at the tips of the air deflectors 6.

The profiled grid, which extends uniformly over the entire combustion chamber annulus, also accommodates the fuel ducting arrangement up to the exit nozzles.

It shall be noted that, in accordance with the present invention, the sum of the tangential pulses of both annular cross-sectional flow fields imparted to the airflows is equal to zero, so that upon mixture, combustion and addition of secondary air a purely axial flow is again present at the entry into the turbine.

Figure 5:
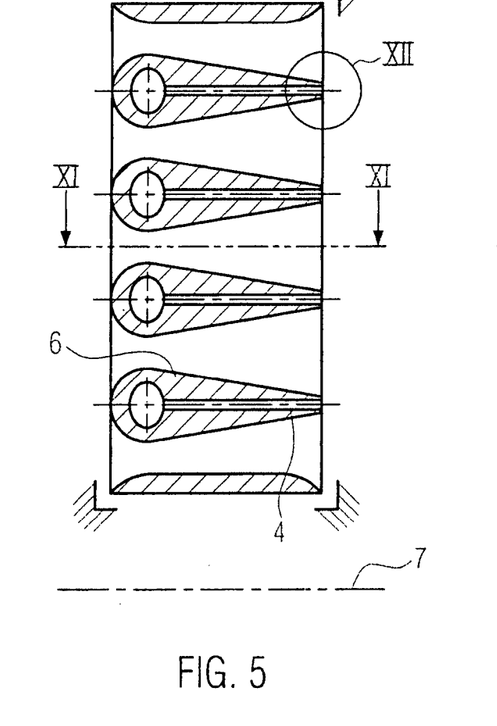
FIG. 5 is a partial sectional view of a combustion chamber annulus in accordance with an embodiment of the present invention, analogically to the representation in FIG. 3, according to arrowhead X of FIG. 4.
Figure 6:
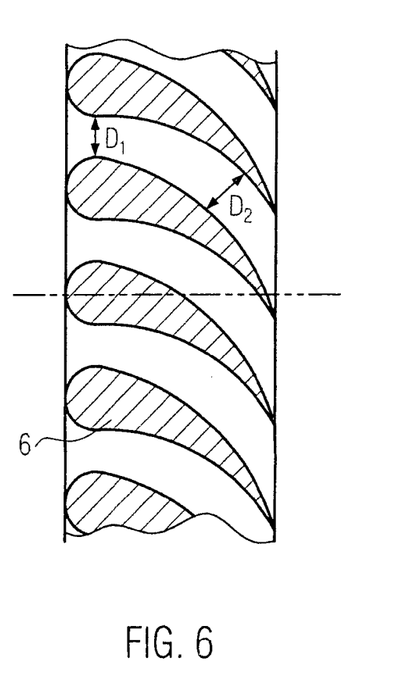
FIG. 6 is an angled sectional view along line XI-XI of FIG. 5.

FIGS. 5 and 6 illustrate, in two sectional views, the design of the grid structure which here is also used for fuel distribution up to the exit openings. FIG. 5 shows an axial injection, with the resultant flow conditions (airflow or fuel flow, respectively) being shown in enlarged representation in FIG. 7. FIG. 6 shows a sectional view along line XI-XI of FIG. 5. As can be seen, the spacing between individual air deflectors 6 is less on the inflow side ($D_1$) than on the outflow side ($D_2$) (here, due to the downstream narrowing of the air deflectors). This results in a retardation of the airflow, for example.

Figure 4:
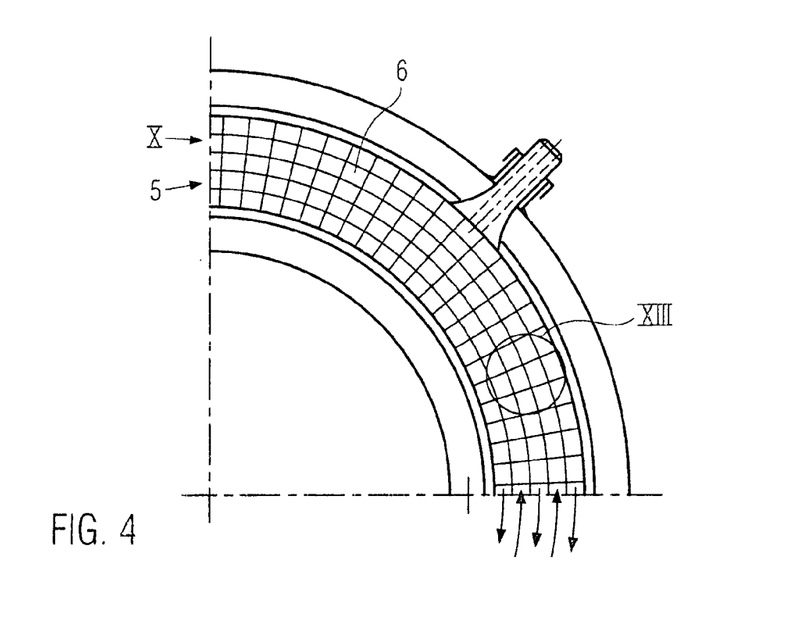
FIG. 4 is a simplified partial front view of the combustion chamber annulus with a grid structure of the air deflectors in alternately counter-directional arrangement for vortex generation in the circumferential direction according to arrowhead IX of FIG. 3.
Figure 8:
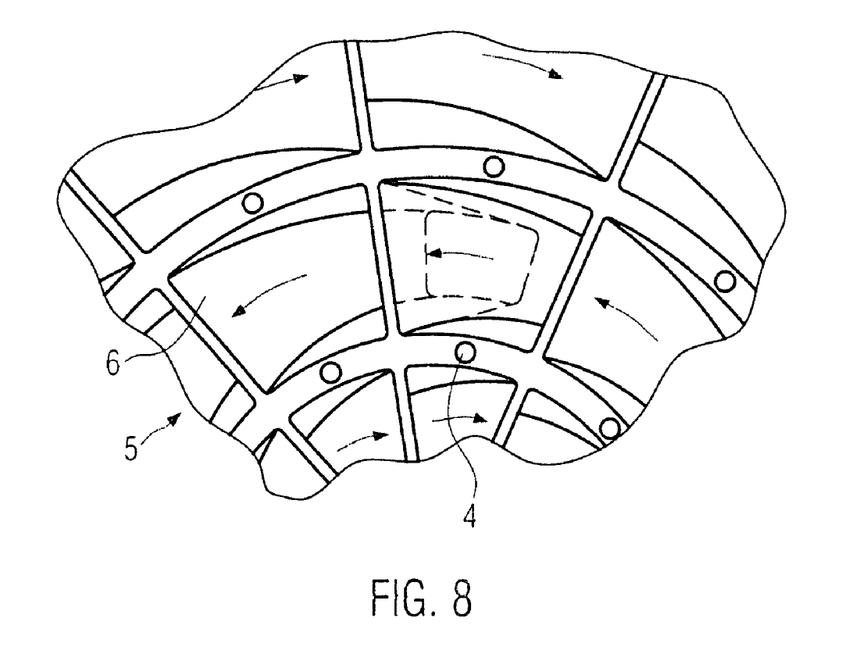
FIG. 8 is another variant, analogically to the views of FIG. 4.
Figure 9:
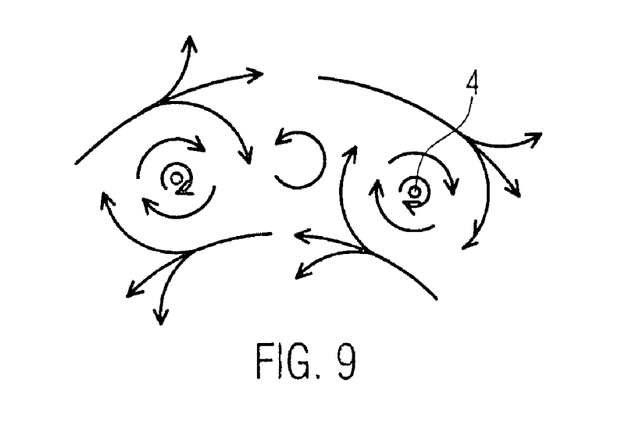
FIG. 9 is a simplified front-side representation of the flow conditions resulting from the embodiment of FIGS. 5, 6 and 8.
Figure 10:
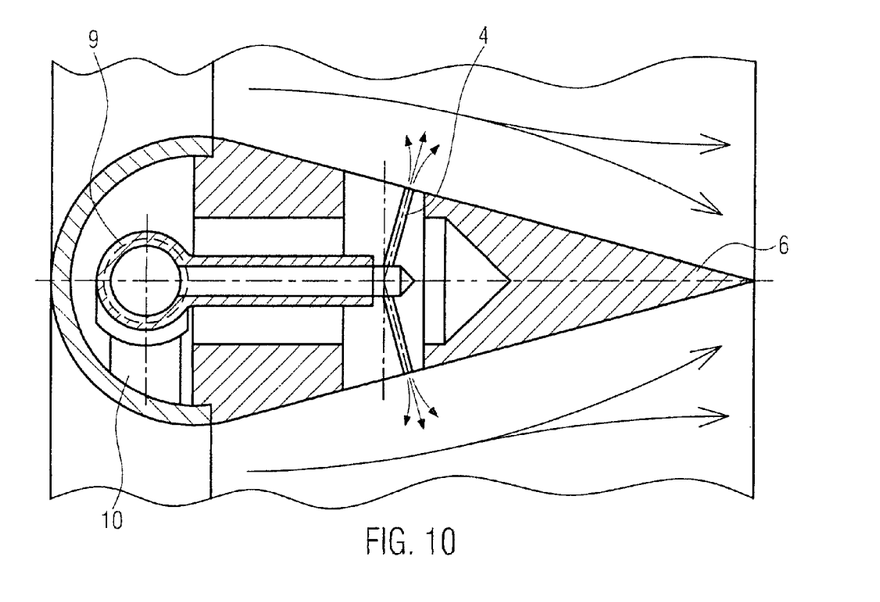
FIG. 10 is another variant of fuel injection transverse to the flow direction including insulation of the fuel lines against high gas temperatures in connection with an air deflector.

The representation of FIG. 8 is an enlarged detail view as per FIG. 4. As can be seen, several radial flow circles through the grid are formed resulting in counter-directional airflows. The resultant air swirl is clarified in FIG. 9. FIG. 10 illustrates a transverse injection of fuel in the grid.

In order to limit the complexity of the fuel ducting arrangement and improve the disassembly situation, it is favorable to separate the annular grid into individual segments. Each of these segments can be radially assembled from the outside via gaps in the casing or in the combustion chamber, respectively. The radially arranged retaining members of the grid segments can also contain the external fuel supply. Such robust grid segments with retaining members can also provide for the fixation or stabilization of the outer and inner combustion chamber wall as per FIG. 3.

In order to prevent the structure of the outer casing with the relatively large air passage slots from being unduly mechanically weakened, a design solution may also be adopted in which fuel Is supplied from the inside to the outside, for example by pluggable or mountable modules as shown in FIG. 4.

Figure 11:
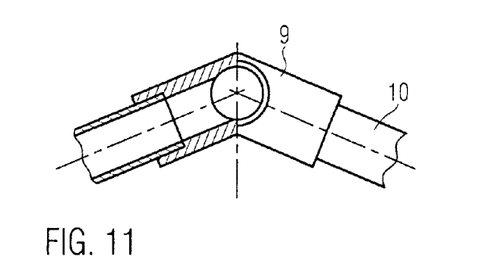
FIGS. 11 and 12 are partial sectional views of the fuel distribution system represented in FIG. 10.
Figure 12:
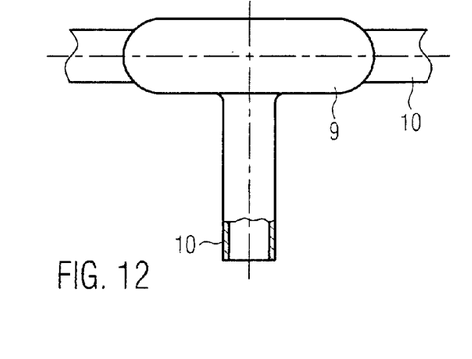
Figure 13:
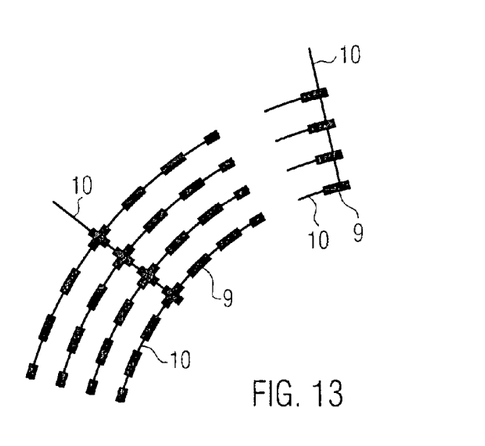
FIG. 13 is a schematic partial front view of the fuel system shown in FIGS. 10, 11 and 12.

The respective arrangement of the fuel ducting system is schematically shown in FIGS. 11 to 13, for example. As illustrated, individual tube connectors 9 can be joined with tubes 10, for example by vacuum brazing. The cavity formed between the individual, annularly arranged fuel lines can be used for active cooling from the outside. The number, size and arrangement of the individual injection nozzles may here be varied and combined diversely. FIGS. 11 to 13 do not provide a detailed illustration of the fuel injection nozzles, but merely illustrate the segment-type design of the fuel supply system.

Homogeneity and speed of fuel-air mixture formation are enhanced if the size of the flow fields is minimized and their number maximized. Shorter mixture formation times enable the total length of the combustion chamber to be reduced.

Figure 7:
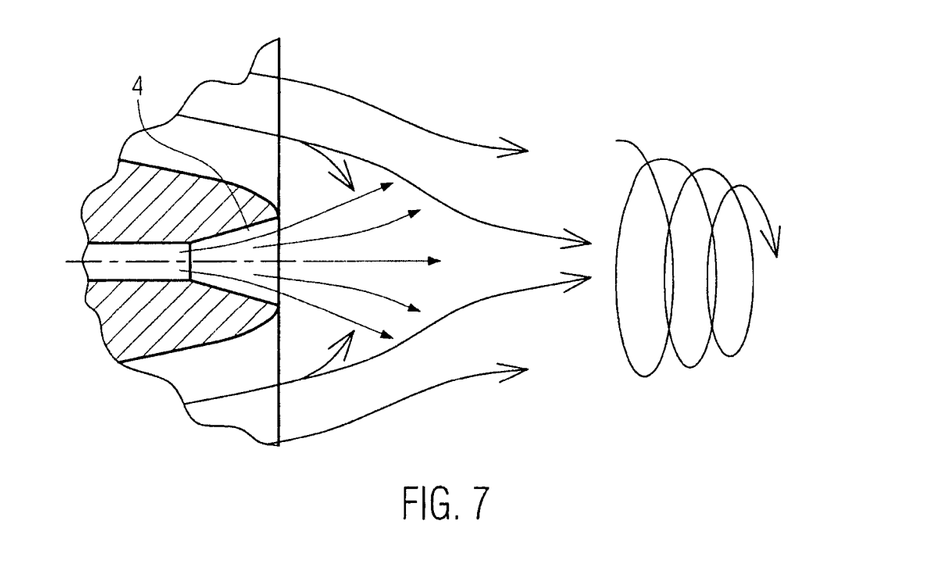
FIG. 7 is a detail view as per detail XII of FIG. 5.

Fuel and primary air can be mixed even faster and more homogeneously if the fuel is not injected parallelly at the end of the air deflector, as shown for example in FIGS. 5 and 7, but already in the profiled grid transversely to the flow or obliquely against or with the flow, respectively, as shown, for example, in FIG. 10.

In the embodiment of the present invention shown in FIGS. 4 and 8, radial offset of each vane row sector is provided using an exit grid formed by the air deflectors 6, this offset augmenting the shearing effect of the tangentially counter-directional exit flows. Augmentation is effected by the circumstance that no disturbing boundary layer superposition is present. Vortex cones are formed at the edges of the individual flows, as shown, for example, in FIGS. 7 and 9. In the center of the conical vortexes, the fuel is issued discretely and by pressure atomizers in the direction of flow, as a result of which, fuel atomizes rapidly and is homogeneously distributed with the flow. This reduces the combustion time. The small, conical vortexes simultaneously act as small flame holders which improve flame stability.

Figure 14:
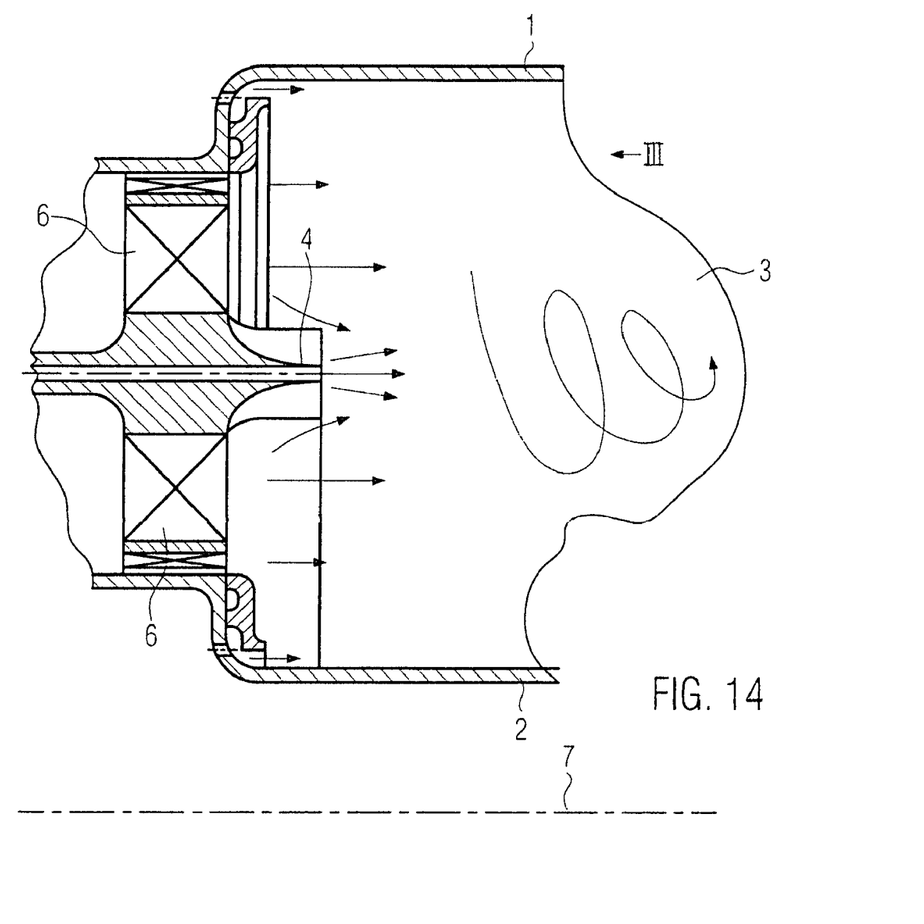
FIG. 14 is an enlarged representation of another embodiment of the annular combustion chamber in accordance with the present invention.
Figure 15:
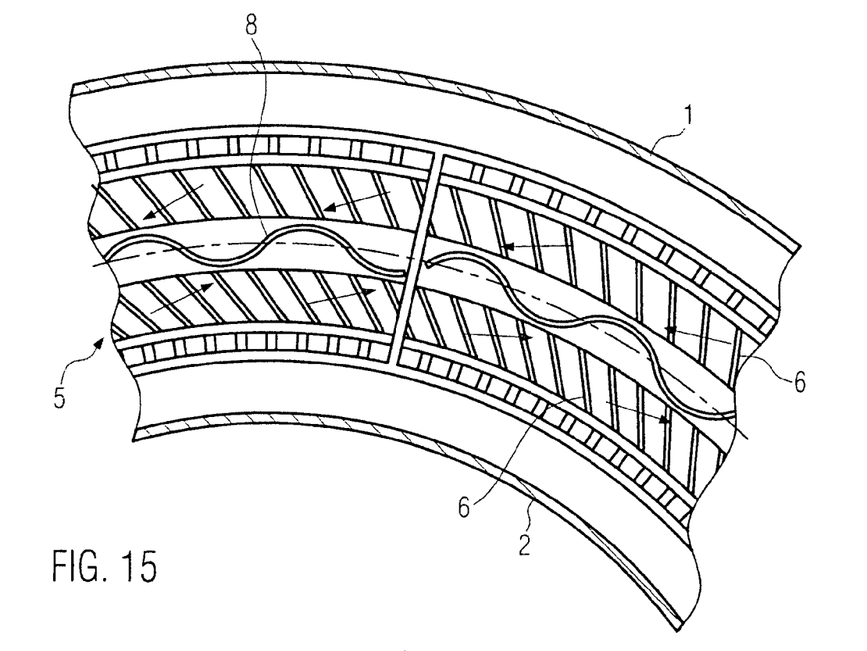
FIG. 15 is a partial front view according to arrowhead III of FIG. 14.

FIG. 14 shows a further embodiment of the present invention. As is apparent from this example, and also from the representation in FIG. 15, air deflectors 6 are arranged in concentric circles around the circumference of a combustion chamber annulus 5 formed by the outer combustion chamber wall 1 and the inner combustion chamber wall 2. These air deflectors 6 lead to local airflows as indicated by the arrowheads, with the tangential components becoming apparent from the representation in FIG. 15, in particular. In the contact area of the tangential airflows of the outer and inner deflectors, a zone of strong local turbulences, analogically to FIG. 9, is created. In this zone a fuel injection slot 8 shown in FIG. 15 in the form of a wave, for example, can be provided. Fuel is here injected in the boundary layer of the two tangentially counter-directional primary flows. Fuel either issues from an annularly arranged, lamellar (waved) or straight slot (see slot 8 in FIG. 15) or from a multitude of fuel nozzles 4 distributed at certain points along the circumference. Here as well, the contacting, axially uni-directional and tangentially counter-directional airflows (see FIG. 15) will start to form numerous small vortexes by the effect of shear forces.

Figure 16:
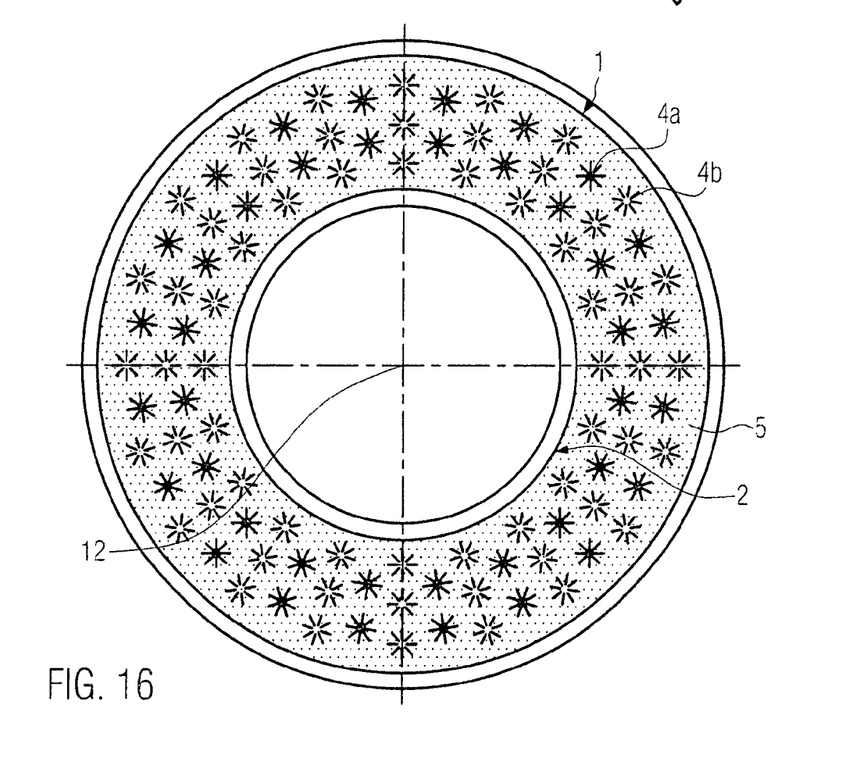
FIG. 16 is a front view, analogically to FIG. 2, of an embodiment according to the present invention of the arrangement of fuel injection nozzles.

FIG. 16 shows an embodiment in accordance with the present invention, actually a basic representation of a combustion chamber cross-section in a view analogically to FIG. 2. As is apparent, a multitude of fuel injection nozzles 4 is provided which are arranged concentrically to the combustion chamber axis and are distributed uniformly. The fuel injection nozzles designated with the reference numeral 4a may, for example, be used for idling and taxiing of an aircraft, while the fuel injection nozzles designated with the reference numerals 4b are switched in/on at maximum power of the gas turbine to inject additional fuel into the combustion chamber. Thus, the entire area of the combustion chamber annulus 5 is uniformly employed.

(Primary) air is supplied to the combustion chamber space via at least two tangentially counter-directional annular flow ducts which, in their entirety, form a type of profiled grid (FIGS. 4 and 5). Here, fuel is sprayed into the combustion chamber space (FIG. 6) via small supply ducts in the grid which issue at small nozzles at the deflector tips. In accordance with the present invention, the function of the profiled grid is:
- to accommodate for the fuel ducting arrangement up to the exit nozzles,
- to treat the (primary) air by extension or restriction of the flow cross-sections such that a stable combustion and position of the flame front is ensured, and
- to produce multiple tangentially counter-directional and axially uni-directional flow fields.

Homogeneity and speed of fuel-air mixture formation are enhanced (reduction of mixture formation time) if the size of the flow fields is minimized and their number maximized. Shorter mixture formation times also enable a reduction of the total length of the annular combustion chamber in general.

The contacting, axially unidirectional and tangentially counter-directional airflows will start to from numerous small vortexes by the effect of shear forces (FIGS. 7 to 9). These airflows accordingly provide for homogenous and rapid mixture with the injected fuel, immediately resulting in faster combustion. The conical vortexes will then form small recirculation areas, thus providing for improved flame stability. For reasons of fluidic design it shall be noted that, in accordance with the present invention, the sum of the tangential pulses of all annular flow fields imparted to the flows is equal to zero, so that upon mixture and combustion a purely axial flow is again present at the entry into the turbine (FIG. 4).

In order to limit the complexity of the fuel ducting arrangement and enable field disassembly, it is recommended to separate the annular grid into individual segments (also refer to FIGS. 10 and 11). Each of these segments can be radially assembled from the outside via gaps in the casing.

The radially arranged retaining members of the grid segments also contain the external fuel supply (FIGS. 10 and 11). The robust grid segments with retaining members can also provide for the fixation of the outer and inner combustion chamber wall (front mounted system).

Further development of the approaches:

Fuel and (primary) air can be mixed even faster and more homogeneously if the fuel is not injected parallelly at the end of the air deflector, but already in the profiled grid transversely to the flow (FIG. 9) or obliquely against or with the flow, respectively. The profiled grid is here of the two-part design due to production constraints. The joint can be made by positive bonding in a brazing process.

The cavity in the above grid can be used for active cooling from the outside, via the shaft of the fuel supply.

The number, size and arrangement of the injection nozzles may be varied diversely.

In order to provide for a mechanically simpler design of the structure of the outer casing with the relatively large flange bolting, a solution may also be adopted in which the fuel connection to the shaft is accomplished from the inside to the outside (also refer to FIG. 4).

The present invention accordingly reflects a development in which

- the annular cross-section available is almost ideally employed,
- the local vortex generators (now) functionally process the fuel curtain on the circumference of the annular combustion chamber,
- the number of fuel injection or spray-in points is increased to enable a locally better controlled and more homogenous combustion to be obtained,
- staged operation by bi-partite or multi-partite fuel supply is principally also provided for.

Accordingly, besides the aforementioned merits, the present invention is advantageous in terms of reduced NOx, shorter combustion times and lean combustion. In summary, a higher combustion efficiency with lower CO and UHC shares is obtained. The thermal efficiency of the gas turbine combustion chamber in accordance with the present invention is higher than the efficiency of the state-of-the-art designs, with the pressure loss being lower. In addition, the present invention enables the build volume to be decreased, enabling the total size of the gas turbine to be reduced. This in turn results in a lower overall weight.

| List of reference numerals | |
| --- | --- |
| 1 | Outer combustion chamber wall |
| 2 | Inner combustion chamber wall |
| 3 | Annular combustion chamber |
| 4 | Fuel injection nozzles |
| 5 | Combustion chamber annulus |
| 6 | Air deflector |
| 7 | Axis |
| 8 | Fuel injection slot |
| 9 | Connectors |
| 10 | Tube |
| 11 | Air inlet rings |
| 12 | Combustion chamber axis |

What is claimed is:

1. A gas turbine combustion chamber comprising:
   an annular combustion chamber confined by an outer combustion chamber wall and an inner combustion chamber wall;
   a plurality of fuel injection nozzles distributed essentially uniformly around the combustion chamber annulus;
   a plurality of air deflectors positioned in a flame-side area of the annular combustion chamber around the entire combustion chamber annulus and concentrically about a combustion chamber axis;
   wherein the air deflectors are arranged in at least two rows concentric about the combustion chamber axis and the fuel injection nozzles are positioned between the two rows of air deflectors, with the airflows from the respective rows being oriented counter-directionally to each other in a circumferential direction.

2. A gas turbine combustion chamber in accordance with claim 1, wherein directions of exit of fuel from the fuel injection nozzles are set at an angle to adjacent airflow direction.

3. A gas turbine combustion chamber in accordance with claim 2, wherein the directions of exit of fuel from the fuel injection nozzles are set at an angle to an axis of the gas turbine.

4. A gas turbine combustion chamber in accordance with claim 3, wherein the air deflectors are arranged relative to each other to create local turbulences in a fuel injection area, but subsequently form an essentially axial total airflow passing through the combustion chamber annulus.

5. A gas turbine combustion chamber in accordance with claim 4, wherein the air deflectors together form a grid structure.

6. A gas turbine combustion chamber in accordance with claim 5, wherein the fuel injection nozzles are integrated into the air deflectors.

7. A gas turbine combustion chamber in accordance with claim 2, wherein the directions of exit of fuel from the fuel injection nozzles are parallel to an axis of the gas turbine.

8. A gas turbine combustion chamber in accordance with claim 7, wherein the air deflectors are arranged relative to each other to create local turbulences in a fuel injection area, but subsequently form an essentially axial total airflow passing through the combustion chamber annulus.

9. A gas turbine combustion chamber in accordance with claim 8, wherein the air deflectors together form a grid structure.

10. A gas turbine combustion chamber in accordance with claim 9, wherein the fuel injection nozzles are integrated into the air deflectors.

11. A gas turbine combustion chamber in accordance with claim 10, and further comprising a fuel injection slot in a wave form.

12. A gas turbine combustion chamber in accordance with claim 10, wherein the air deflectors include waved outflow edges.

13. A gas turbine combustion chamber in accordance with claim 10, wherein individual fuel injection nozzles can be switched on depending on a respective power requirement.

14. A gas turbine combustion chamber in accordance with claim 1, wherein the air deflectors are arranged relative to each other to create local turbulences in a fuel injection area, but subsequently form an essentially axial total airflow passing through the combustion chamber annulus.

15. A gas turbine combustion chamber in accordance with claim 1, wherein the air deflectors together form a grid structure.

16. A gas turbine combustion chamber in accordance with claim 1, wherein the fuel injection nozzles are integrated into the air deflectors.

17. A gas turbine combustion chamber in accordance with claim 1, and further comprising a fuel injection slot in a wave form.

18. A gas turbine combustion chamber in accordance with claim 1, wherein the air deflectors include waved outflow edges.

19. A gas turbine combustion chamber in accordance with claim 1, wherein individual fuel injection nozzles can be switched on depending on a respective power requirement.

20. A gas turbine combustion chamber comprising:
    an annular combustion chamber confined by an outer combustion chamber wall and an inner combustion chamber wall;
    a fuel injection slot in a wave form extending around the combustion chamber annulus;
    a plurality of air deflectors positioned in a flame-side area of the annular combustion chamber around the entire combustion chamber annulus and concentrically about a combustion chamber axis;
    wherein the air deflectors are arranged in at least two rows concentric about the combustion chamber axis and the fuel injection slot is positioned between the two rows of air deflectors, with the airflows from the respective rows being oriented counter-directionally to each other in a circumferential direction.

* * * * *